US012576814B2

(12) United States Patent
Salim et al.

(10) Patent No.: US 12,576,814 B2
(45) Date of Patent: Mar. 17, 2026

(54) METHOD FOR DETERMINING A CLEANING INFORMATION, METHOD FOR TRAINING OF A NEURAL NETWORK ALGORITHM, CONTROL UNIT, CAMERA SENSOR SYSTEM, VEHICLE, COMPUTER PROGRAM AND STORAGE MEDIUM

(71) Applicant: Continental Autonomous Mobility Germany GmbH, Ingolstadt (DE)

(72) Inventors: Sabin Hamed Salim, Kronach (DE); Viktor Dering, Langenau (DE); Thomas Bopp, Ulm (DE); René Schuster, Neustadt an der Weinstraße (DE)

(73) Assignee: Continental Autonomous Mobility Germany GmbH, Ingolstadt (DE)

( * ) Notice: Subject to any disclaimer, the term of this patent is extended or adjusted under 35 U.S.C. 154(b) by 1 day.

(21) Appl. No.: 18/605,343

(22) Filed: Mar. 14, 2024

(65) Prior Publication Data

US 2024/0308470 A1      Sep. 19, 2024

(30) Foreign Application Priority Data

Mar. 14, 2023     (EP) ..................................... 23161926

(51) Int. Cl.
  *B60S 1/08*           (2006.01)
(52) U.S. Cl.
  CPC ........... *B60S 1/0862* (2013.01); *B60S 1/0848* (2013.01)
(58) Field of Classification Search
  CPC ... B60S 1/0862; B60S 1/0848; H04N 23/811; H04N 23/61; G06V 20/58; G06V 10/26; G06V 10/764; G06V 10/82
    (Continued)

(56) References Cited

U.S. PATENT DOCUMENTS 10,339,812 B2 *  7/2019  Tamer .................... H04N 23/40
10,829,091 B2   11/2020  Herman
      (Continued)

FOREIGN PATENT DOCUMENTS

DE       102021201255 A1   8/2022
JP          2016009099 A   1/2016
      (Continued)

OTHER PUBLICATIONS

Reasons for Refusal mailed on Nov. 6, 2024 for the counterpart Japanese Patent Application No. 2024-035504 and machine translation of same.
      (Continued)

*Primary Examiner* — John W Miller
*Assistant Examiner* — Omer Khalid
(74) *Attorney, Agent, or Firm* — Fitch, Even, Tabin & Flannery LLP

(57)          ABSTRACT

Method for determining cleaning information for a camera sensor which includes a blockage on a transparent camera sensor component in an optical camera sensor path, the method including:

processing a captured camera image with a neural network algorithm which determines as an output a degree of camera sensor blockage by segmenting a part of the camera image and a camera sensor blockage class by classification of a part of the camera image, determining cleaning information dependent on the camera sensor blockage degree and the camera sensor blockage class, wherein the cleaning information describes that a cleaning of the camera sensor is required if a cleaning criterion is assigned to the determined camera sensor blockage class and if a degree threshold is exceeded by the determined camera sensor blockage degree, and (Continued)

transmitting the cleaning information to a camera sensor cleaning device to clean the camera sensor.

14 Claims, 3 Drawing Sheets

(58) Field of Classification Search
USPC ........................................................ 348/148
See application file for complete search history.

(56) References Cited

U.S. PATENT DOCUMENTS

| | | | |
|---|---|---|---|
| 2013/0308004 A1* | 11/2013 | Liu | ............................ G06T 7/11 |
| | | | 348/E5.025 |
| 2020/0094784 A1* | 3/2020 | Herman | ................. B60S 1/0848 |
| 2020/0139936 A1* | 5/2020 | Yamauchi | .................. B60S 1/36 |
| 2020/0394813 A1 | 12/2020 | Theverapperuma | |
| 2021/0192745 A1 | 6/2021 | Kahlbaum | |
| 2024/0083390 A1 | 3/2024 | Peret et al. | |

FOREIGN PATENT DOCUMENTS

| | | | |
|---|---|---|---|
| WO | 2019116607 A1 | 6/2019 | |
| WO | 2022162235 A1 | 8/2022 | |

OTHER PUBLICATIONS

Reasons for Refusal mailed on Feb. 12, 2025 for the counterpart Japanese Patent Application No. 2024-035504 and machine translation of same.

European Search Report dated Jul. 31, 2023 for the European Patent Application No. 23161926.3 which this application claims priority.

Michal Uricar et al., "Desoiling Dataset: Restoring Soiled Areas on Automotive Fisheye Cameras", 2019 IEEE/CVF International Conference on Computer Vision Workshop (ICCVW), Date of Conference: Oct. 27-28, 2019, DOI: 10.1109/ICCVW.2019.00526.

Hanghang Tong et al., "Blur detection for digital images using wavelet transform", 2004 IEEE International Conference on Multimedia and Expo (ICME) (IEEE Cat. No. 04TH8763), Date of Conference: Jun. 27-30, 2004, DOI: 10.1109/ICME.2004.1394114.

Vera Soboleva et al., "Raindrops on Windshield: Dataset and Lightweight Gradient-Based Detection Algorithm", 2021 IEEE Symposium Series on Computational Intelligence (SSCI), Date of Conference: Dec. 5-7, 2021, pp. 1-7, DOI: 10.1109/SSCI50451.2021.9659915.

Michal Uricar et al., "SoilingNet: Soiling Detection on Automotive Surround-View Cameras", 2019 IEEE Intelligent Transportation Systems Conference (ITSC), Date of Conference: Oct. 27-30, 2019, pp. 67-72, DOI: 10.1109/ITSC.2019.8917178.

Dhinakaran K et al., "Dust Particles Detection on Camera Lens", Proceedings of the International Conference on Industrial Engineering and Operations Management Dubai, UAE, Mar. 10-12, 2020, pp. 1495-1503.

* cited by examiner

METHOD FOR DETERMINING A CLEANING INFORMATION, METHOD FOR TRAINING OF A NEURAL NETWORK ALGORITHM, CONTROL UNIT, CAMERA SENSOR SYSTEM, VEHICLE, COMPUTER PROGRAM AND STORAGE MEDIUM

CROSS-REFERENCE TO RELATED APPLICATIONS

The present application claims the benefit and/or priority of European Application No. 23161926.3 filed on Mar. 14, 2023, the content of which is incorporated by reference herein.

TECHNICAL FIELD

The present disclosure relates to a method for determining a cleaning information for an at least partially blocked camera sensor, which includes a blockage on a transparent camera sensor component in an optical path of the camera sensor. Furthermore, the present disclosure relates to a method for training of a neural network algorithm as well as to a control unit, a camera sensor system, a vehicle, a computer program, and a storage medium.

BACKGROUND

In modern vehicles, camera sensors are used to capture the surroundings of the vehicle, in particular for providing the functionalities of advanced driver assistance systems to a driver of the vehicle. Therefore, the camera sensors are directed to the environment of the vehicle, which requires that at least a part of the camera sensor is located at the outer surroundings of the vehicle. Normally, this is a transparent part, for instance a camera lens or transparent camera cover. Depending on the weather conditions in the environment of the vehicle and/or depending on the driving conditions of the vehicle, these parts of the camera sensor may become subject to blockage. In a blocked state, the camera sensor is at least partly obstructed, for instance by dirt or by precipitation like rain, snow, or the like.

Since such a blockage of the camera sensor reduces or prohibits its capabilities of detecting features in the surroundings of the vehicle, it is known to detect a blocked state of the camera sensor in order to initiate a cleaning of the camera sensor for removing the blockage.

In U.S. Pat. No. 10,829,091 B2, a processor configured to detect an occlusion on a surface in a vehicle sensor optical path based on segmentation of sensor image data is described. Dependent on the detected occlusion as well as dependent on map data and vehicle route data, a cleaning plan for the surface is selected.

DE 10 2021 201 255 A1 discloses a computer-implemented method for detection of a view field obstruction covering an image-capturing sensor. The method compares a first data set of a captured scene to a reference topology of the scene described in a second data set. An obstruction is detected, if a deviation of classified scene elements of the first data set from classified scene elements of the second data set exceeds a threshold.

Since each detection of a presumed blockage of the camera sensor may lead to a cleaning of the camera sensor, the detection of the blockage should be as precise as possible to avoid any unnecessary cleaning by a cleaning device assigned to the camera sensor.

SUMMARY

Therefore, the present disclosure is based on the objective problem to provide an improved method for providing a cleaning information, which in particular improves the detection of a blockage of the camera sensor and the cleaning of the blocked camera sensor by a cleaning device assigned to the camera sensor.

According to the present disclosure, this objective problem is solved by a method as initially described, which includes the steps of:

controlling the camera sensor to capture at least one camera image, processing, by a computing device, the at least one camera image with a neural network algorithm, wherein the neural network algorithm is adapted to determine as an output, from the or each camera image, a degree of camera sensor blockage by segmentation of at least a part of the camera image and a blockage class of a camera sensor blockage from a plurality of blockage classes by classification of at least a part of the camera image, determining a cleaning information in dependency of the degree of camera sensor blockage and the class of the camera sensor blockage, wherein the cleaning information describes that a cleaning of the camera sensor is required, if a cleaning criterion is assigned to the determined class of the camera sensor blockage and if at least one degree threshold is exceeded by the determined degree of camera sensor blockage, and transmitting the cleaning information to a cleaning device associated with the camera sensor in order to clean the camera sensor according to the cleaning information.

The camera sensor may for instance be a camera sensor of a vehicle, in particular a camera sensor used as a part of a driver assistance system for capturing at least a part of the vehicle surroundings. The transparent camera sensor component may in particular be a component arranged within an optical path of the camera like a lens, a protective lens cover, a light filtering element or the like, which is at least partly transparent for light in the visible spectrum. The transparent camera sensor component may be arranged at an outer surface of a vehicle, for instance in a front or rear bumper, in a side-view mirror, or in any other part of the vehicle body.

In a first step of the method for determining the cleaning information, the camera sensor is controlled to capture at least one camera image. If the transparent camera sensor component is blocked, the blockage is visible in the image, since at least a portion of the transparent camera sensor component is covered by the blockage so that a portion of the field of view of the camera sensor is obstructed by the blockage.

The at least one camera image is then processed by a computing device. The camera image is the input data of a neural network algorithm which processes the captured camera image. The neural network algorithm is implemented in the computing device. The neural network algorithm is adapted to determine for each processed camera image both a degree of camera sensor blockage and a blockage class of a plurality of blockage classes as outputs.

The degree of camera sensor blockage, which is denoted in the following also as degree of blockage, is determined by segmentation of at least a part of the camera image. The degree of blockage is a measure for the portion of the field of view of the camera sensor that is blocked by a blockage, or obstructed by the blockage, respectively. The degree of blockage may vary for instance between 0% for an unblocked camera sensor and 100% for a completely blocked camera sensor.

In addition to the degree of blockage, the neural network algorithm determines a blockage class of a camera sensor blockage by classification of at least a part of the camera image. The blockage class of camera sensor blockage is denoted in the following also as blockage class.

The blockage class may be chosen from a plurality of predetermined blockage classes which may cover different types of precipitations that may cover the transparent camera sensor component during operation. The blockage classes may include at least one class which describes an unblocked sensor, i.e., a case in which no blockage is present. At least to some of the blockage classes, a cleaning criterion may be assigned, i.e., at least some of the classes may be labeled as a type of blockage that may be removed by a cleaning procedure. The determination of the blockage class occurs for instance in parallel or sequentially to the determination of the degree of blockage in the neural network algorithm.

After determining the degree of blockage and the blockage class as outputs of the neural network algorithm, a cleaning information is determined in dependency of these outputs. The cleaning information may describe that a cleaning of the camera sensor is required, i.e., that a blockage of the camera sensor has been detected and that the blockage shall be removed by a cleaning procedure. Hence, for determining the cleaning information, it is checked whether a blockage class, to which a cleaning criterion is assigned, was detected. In addition, it is checked during the determination of the cleaning information, whether the degree of blockage determined by the neural network algorithm exceeds a predetermined threshold. In other words, the cleaning information may describe that a cleaning of the camera sensor is required if both a blockage type to be cleaned has been detected and a substantial degree of the field of view of camera sensor is obstructed by the blockage.

If a cleaning of the camera sensor is required, the cleaning information is transmitted to a cleaning device associated with the camera sensor. The cleaning device may be any device that is capable of cleaning the camera sensor, or capable of removing the detected blockage form the transparent camera sensor component, respectively. The cleaning information may in particular include information regarding a suitable cleaning process for the detected blockage type and/or for the detected degree of blockage.

The detection of both the degree of blockage and the blockage class has the advantage that the cleaning information can be determined depending on both the amount of blockage and the type of blockage. In particular, it is possible to clean the camera sensor in accordance with a medium type of the blockage and/or with a severity of the blockage. Furthermore, the cleaning of the sensor can be conducted using the optimal amount of cleaning media and/or energy so that the efficiency of the cleaning process can be enhanced. Advantageously, unnecessary cleaning procedures, or an unnecessary duration of cleaning procedures, and/or a waste of a cleaning medium can be prevented.

In addition, the determination of both the degree of blockage and the blockage type, or the usage of both a segmentation and a classification, respectively, creates redundancy in the determination of the presence of a blockage. This redundancy allows for improving the detection of states which require a cleaning and to decrease the amount of false detection that would lead to false decisions regarding the cleaning.

Furthermore, this redundancy allows for decreasing a time required to detect a blocked state of the camera sensor necessitating a cleaning. The reduced time for the blockage determination also enables a faster processing of the camera image in further algorithms, for instance in an image restoration algorithm, that restores blocked portions of the camera image. Advantageously, this leads to shorter response times of driver assistance functions making use of the camera images provided by the camera sensor.

The usage of the neural network algorithm for detecting a blocked state of the camera sensor to be cleaned has the advantage that an automated cleaning adapted to a detected blockage is possible without user interaction. Furthermore, it allows determining reliably a blockage also on never-seen images, which occur on principle by using camera sensors capturing for instance a part of a vehicle surroundings. Advantageously, the blockage can be detected from single camera images, so that the need for additional real-time frame computations on a plurality of camera images of a camera image stream in order to detect a blockage is eliminated.

The method according to the present disclosure can be used advantageously in systems which include only a single sensor, since no sensor redundancy is required for detecting the blockage. However, the method according to the present disclosure can be applied as well to a plurality of camera sensors of a multi-sensor system, even if their respective fields of view are not overlapping, since the blockage detection may occur for each of the camera sensors based only on the camera images provided by the particular camera sensor.

Blockage detection and optimized cleaning may for instance be important for safety relevant aspects of advanced driver assistance systems (ADAS) functionalities in vehicles as a clean camera lens is a precondition for other functionalities, for example for a semantic segmentation of roads or the like. In particular in autonomous driving scenarios, the method according to the present disclosure has the advantage that no reference image for determining a blockage is required. A comparison between an image captured by a camera sensor to a reference image may be challenging in real world driving environments since a scene captured in these images may be subject to more or less changes due to a movement of the vehicle. Besides vehicles, the method according to the present disclosure can be used also in any other type of device that relies on camera images provided by at least one camera sensor that is prone to be blocked by cleanable blockages prior to or during operation.

In an example embodiment of the present disclosure, the neural network algorithm is or includes a semantic segmentation algorithm and/or an algorithm including both a binary segmentation and a classifier model. The neural network algorithm may be for instance a semantic segmentation algorithm (SemSeg-algorithm) capable of a multi-class segmentation, which allows for determining the degree of blockage and the respective blockage class. Additionally or alternatively, the neural network algorithm may be for instance a combined binary segmentation and classification algorithm (BinCla-algorithm), which determines by segmentation both blocked segments, or blockage segments, respectively, and unblocked areas in the camera image and which assigns a blockage class to the blockage segments.

The plurality of blockage classes may include at least one unblocked class to which no cleaning criterion is assigned. This allows also to cover states in which no blockage of the camera sensor is present. In such cases, no cleaning information may be determined, or the cleaning information may contain the information that no cleaning is required.

In an example embodiment, the plurality of blockage classes includes at least a soiling class, a droplet class, and/or a condensation class, to which each a cleaning criterion is assigned. Hence, the neural network algorithm may be capable to differentiate between a blockage by soiling, a blockage by droplets and/or a blockage by condensation. It is possible that further classes, to which each a cleaning criterion is assigned, exist, wherein the further classes may include additional types of precipitation and/or other blockage types that occur in a specific environment of the camera sensor. As further classes for instance a snow class, an ice class or a dust class may be used, wherein these blockage classes describe a blockage of the transparent camera sensor component by snow, ice, or dust, respectively.

The cleaning information may be determined by a further algorithm, wherein the cleaning information describes a cleaning strategy for cleaning the camera sensor, wherein the cleaning strategy is determined from a plurality of cleaning strategies in dependency of the determined blockage class and/or by comparison of the determined degree of camera sensor blockage to two or more different degree thresholds assigned to each cleaning strategy. This allows to define different cleaning strategies for different types of blockages and/or for different degrees of blockage, i.e. for one class of blockage, two or more cleaning strategies may be defined depending on the degree of blockage. For instance, if soiling is determined as a blockage class, different cleaning strategies can be chosen for a degree of blockage between 10% and 67% and for above 67%, wherein for a degree of blockage below 10%, no cleaning information is determined.

The further algorithm may receive the outputs of the neural network, i.e. the degree of blockage and the blockage class, as inputs. In an embodiment, a decision tree is used as the further algorithm. By a decision tree, different cleaning strategies may be assigned to different blockage classes and different blockage thresholds. The usage of a decision tree allows for quickly determining the cleaning strategy described by the cleaning information. The cleaning strategy, which is described by the cleaning information, is advantageously adapted to the detected blockage class and to the detected degree of blockage.

The cleaning strategy may include one or more commands for the cleaning device, wherein the commands may include cleaning medium emission, duration and/or amount of the cleaning medium emission, a temperature and/or a composition of the cleaning medium emission, a duration and/or an intensity of a cleaning actuator operation or the like.

In an example embodiment, the cleaning strategy is determined additionally in dependence of at least one cleaning device state information, which describes a current state of the cleaning device. The cleaning device state information may be for instance a level of a cleaning fluid in a container. In addition or as an alternative, other types of cleaning device state information may be used. Considering also the current state of the cleaning device allows for adapting the cleaning strategy for cleaning the camera sensor to the cleaning capability of the cleaning device in its current state, so that unnecessary or unrealizable commands can be avoided.

According to the present disclosure, the cleaning information may include cleaning commands for a liquid-based cleaning, an air-based cleaning, and/or an actuator-based cleaning. The cleaning device may be adapted to emit a cleaning fluid, for instance water and/or a detergent, and/or air for cleaning of the camera sensor in particular for cleaning the transparent cameras sensor component. In addition or alternatively, the cleaning device may include an actuator for cleaning, for instance a moveable wiper blade, an ultrasonic actuator or the like, which allows for mechanically removing the blockage from the transparent camera sensor component.

The present disclosure further relates to a method for training of a neural network algorithm including the steps of:
- Providing a plurality of camera images captured by at least one unblocked camera sensor,
- Augmenting at least some of the camera images by superimposing a blockage mask on each camera image, wherein the blockage mask is assigned to a blockage class of a plurality of blockage classes, wherein the blocking mask blocks a portion of the camera image according to a blocking degree of the blockage mask, wherein the blocking degree is determined stochastically for each camera image,
- Associate a label to each camera image, wherein the label describes the blockage class and the blocking degree of the blockage mask augmented to the camera image,
- Generating an output of the neural network algorithm for each augmented camera image by processing the augmented camera image through one or more network layers of the neural network algorithm in accordance with parameters associated with the one or more network layers,
- Comparing the generated output for each augmented camera image with the label associated with the augmented camera image using an objective function, and
- Updating the parameters based on the comparison.

In particular, the method for training of a neural network algorithm according to the present disclosure may be used for training of the neural network algorithm of a method for determining a cleaning information for an at least partially blocked camera sensor according to the present disclosure. Hence, the neural network algorithm of a method for determining a cleaning information for an at least partially blocked camera sensor according to the present disclosure may be trained by a method for training of a neural network algorithm according to the present disclosure.

The method for training of the neural network algorithm uses a plurality of camera images captured by an unblocked camera sensor. These images may show in particular different surroundings of the camera sensor that are expected to occur in the regular usage of the camera sensor. For instance, if a neural network for a camera sensor used to capture the surroundings of a vehicle is trained, different scenes that may occur during the operation of a vehicle may be depicted on the provided camera images.

The provided camera images are captured by an unblocked camera sensor, so that initially no blockage is present in these images. To train the neural network algorithm to determine segments of blockage, or a degree of blockage, respectively, and different blockage classes, at least some of the unblocked images are augmented by superimposing a blockage mask. The blockage mask represents a certain type of blockage that virtually covers a certain degree of the field of view of the camera sensor. The blockage, that is virtually augmented to the camera image, is assigned to a blockage class chosen from a plurality of blockage classes. The blockage mask may reproduce virtually a certain type of blockage by covering one or more portions of the camera image correspondingly to a certain type of blockage, for instance correspondingly to soiling, droplets, or condensation.

To obtain as many different augmented images as possible, each blockage mask covers a stochastically determined, or randomly determined, respectively, portion of the camera image. Therefore, the blocking degree of each mask is stochastically determined, wherein the blocking degree of the blockage mask corresponds to the degree of blockage of a camera image superimposed with the blockage mask. The stochastic determination of the blocking degree allows for creation of a large number of differently blocked augmented camera images and therefore for a precise and extensive training of the neural network algorithm on different degrees of blockage and different blockage classes. Therefore, the method for training of a neural network according to the present disclosure is especially suited for a method for determining a cleaning information according to the present disclosure since the automated creation of virtually blocked images allows for training the neural network on a wide variety of differently blocked images.

To each augmented camera image, a label is assigned that describes the blockage class and the blocking degree of the blockage mask used for augmenting the particular camera image. The label is in particular created by the same computing device that is used for augmenting the camera images with the blocking masks. This significantly reduces the effort in the creation of training data since no manual labelling of the training data, or the augmented camera images, respectively, is required.

The augmented and labelled camera images are then provided to the neural network algorithm to be trained in order to generate a corresponding output of the neural network algorithm. Therefore, the neural network algorithm processes the augmented and labelled camera images through one or more network layers in accordance with the parameters associated with each layer.

Afterwards, the output of the neural network algorithm for each augmented camera image, in particular the determined degree of blockage and the determined blockage class, is compared to the label assigned to the respective augmented and labelled camera image that was used as input. For the comparison, an operative function may be used, which quantifies and/or qualifies the congruence of the output of the neural network algorithm with the label assigned to the respective augmented camera image. Based on the result of the comparison using the objective function, the parameters associated with the one or more layers of the neural network algorithm are updated to increase the congruence between the label and the output of the neural network algorithm.

It is possible that some of the camera images used for training of the neural network algorithm are not augmented by a blockage mask to cover also the case of an unblocked state of the camera sensor. This allows for instance to train the neural network algorithm on determining a degree of blockage of 0% and/or a blockage class describing an unblocked camera sensor, respectively.

In an example embodiment, additionally at least one further parameter related to the appearance of the blockage mask is stochastically varied, wherein the at least one further parameter is in particular a color, a color distribution, a transparency, a transparency distribution, a number of masking segments, a distribution of masking segments, a size of masking segments and/or a contour of masking segments of the blockage mask is stochastically varied. This allows for further adapting the virtual blockage created by the blockage mask on blockage types that may occur in reality. By varying parameters like color, transparency, or their distribution, respectively, different types of soiling may be represented. In addition, also the number, size, contour and/or distribution of masking segments may be varied to cover as many possible appearances of blockages as possible.

The at least one further parameter may be varied within one or more intervals associated with the blockage class assigned to the blockage mask. This allows for adapting the blockage mask to the specific appearances of different blockage classes. For instance, for simulating a camera sensor component blocked by rain drops, a larger number of segments including a round or elliptic shape with a comparatively high transparency may be used, wherein for a blockage by soiling fewer, bur larger segments with a higher opacity and a more inconstant shape may be used.

A control unit according to the present disclosure includes a computing device, wherein the control unit is adapted to carry out a method for determining a cleaning information according to the present disclosure.

A camera sensor system according to the present disclosure includes at least one camera sensor, at least one cleaning device associated with the camera sensor and a control unit according to the present disclosure.

A vehicle according to the present disclosure includes a camera sensor system according to the present disclosure.

A computer program according to the present disclosure includes instructions which control a computer to carry out a method for determining a cleaning information according to the present disclosure.

A non-transient storage medium according to the present disclosure includes a computer program according to the present disclosure.

All details and advantages described in relation to one of the methods according to the present disclosure apply to the other method correspondingly. In addition, these details and advantages apply correspondingly to the control unit, the camera sensor system, the vehicle, the computer program, the storage medium and vice versa.

BRIEF DESCRIPTION OF THE DRAWINGS

Further features and details of the present disclosure are discussed in relation to the figures. The figures are schematical drawings and show.

DETAILED DESCRIPTION

Figure 1:
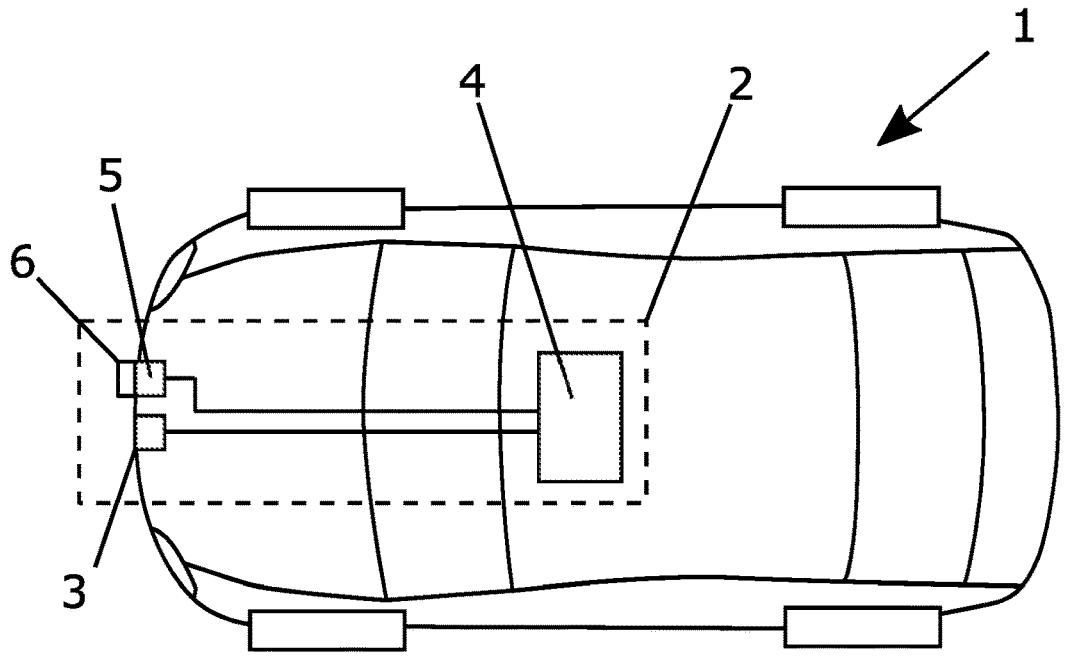
FIG. 1 is an embodiment of a vehicle according to the present disclosure.

In FIG. 1, an embodiment of a vehicle 1 is shown. The vehicle 1 may be a motorized or an unmotorized vehicle, for instance a passenger car, a truck, a train, a trailer, or the like. The vehicle 1 includes a camera sensor system 2, wherein the camera sensor system 2 includes a camera sensor 3, a control unit 4 and a cleaning device 5. The camera sensor 3 and the cleaning device 5 communicate with the control unit 4 via a communication link, for instance via a bus system like CAN-Bus and/or via one or more point-to-point connections.

The camera sensor 3 is arranged at a body of the vehicle 1, for instance in a bumper, in a side mirror or in a radiator grille of the vehicle 1. The camera sensor 3 is adapted to capture camera images, in particular a video stream including a plurality of subsequently captured camera images. By the camera sensor 3, a portion of the surroundings of the vehicle 1 is captured.

The camera sensor system 2 may be part of a driver assistance system of the vehicle 1. The driver assistance system may be adapted to provide at least one control signal to an actuator of the vehicle 1 and/or at least one optical and/or acoustic signal to a driver of the vehicle 1 in dependence on the camera images provided by the camera sensor 3, in particular in dependence of an interpretation of the content of the camera images provided by the camera sensor 3, respectively.

The cleaning device 5 is assigned to the camera sensor 3 and adapted to clean the camera sensor 3, in particular to clean a transparent camera sensor component 6 like a lens, an optical filer and/or a transparent cover of the camera sensor 3, arranged in an optical path of the camera sensor 3. The cleaning device 5 may be adapted to emit a cleaning fluid, for instance water, a detergent, and/or air, for cleaning of the transparent camera sensor component 6. In addition or alternatively, the cleaning device 5 may include an actuator (not shown) for cleaning, for instance a moveable wiper blade, an ultrasonic actuator or the like, which allows for mechanically removing a blockage like drops, soiling or condensation from the transparent camera sensor component 6.

The control unit 4 is or includes a computing device. The control unit 4 is adapted to conduct a method for determining a cleaning information for the camera sensor 3, when it is at least partially blocked, i.e. when the transparent camera sensor component 6 is at least partly covered by a blockage that obstruct the field of view of the camera sensor 3.

Figure 2:
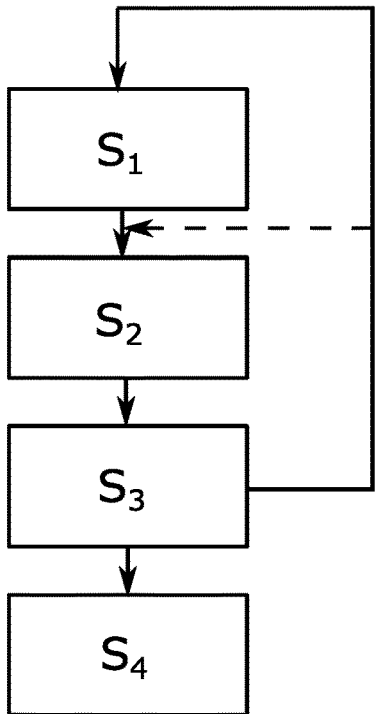
FIG. 2 is a block diagram of an embodiment of the method for determining a cleaning information for an at least partly blocked camera sensor according to the present disclosure.

In FIG. 2, a block diagram of an embodiment of the method for determining a cleaning information for the at least partly blocked camera sensor 3 is shown.

In step $S_1$, the camera sensor 3 is controlled to capture at least one camera image, for instance by sending a trigger for the image acquisition from the control unit 4 to the camera sensor 3. It is also possible that the camera sensors 3 is controlled by a further control device of the vehicle 1 to capture one or more camera images. The camera sensor 3 captures at least one camera image and transmits it to the control unit 4. It is possible that the camera sensor 3 captures a video stream including a plurality of subsequently captured camera images, wherein the single camera images are continuously transmitted to the control unit 4 for blockage detection and/or for determination of cleaning information.

In step $S_2$, a camera image transmitted to the control unit 4 is processed by the control unit 4 with a neural network algorithm implemented in the control unit 4. The neural network algorithm is adapted to determine, as an output of the neural network algorithm, from the or each camera image processed by the neural network algorithm both a degree of camera sensor blockage by segmentation of at least a part of the camera image and a blockage class of a camera sensor blockage from a plurality of blockage classes by classification of at least a part of the camera image. For instance, a semantic segmentation algorithm and/or an algorithm including both a binary segmentation and a classifier model may be used as neural network algorithm, or as parts of the neural network algorithm, respectively.

The degree of camera sensor blockage describes the portion of the field of view of the camera sensor 3, which is covered by a blockage on the transparent camera sensor component 6. The degree of camera sensor blockage may vary between 0% and 100%, wherein 0% describes a state in which the field of view of the camera sensor 3 is unblocked, 100% describes a state in which the field of view of the camera sensor 3 is fully blocked, and the values in between describe states in which the field if view of the camera sensor 3 is partially blocked.

The degree of blockage is determined by segmentation of the camera image, wherein one or more portions of the camera image depicting the blockage and one or more portions of the camera image depicting parts of the vehicle surroundings are determined. The degree of blockage may be determined for instance as ratio between the area of the segments depicting the blockage to the area of the unblocked segments depicting the surroundings.

In addition to the degree of blockage, the neural network algorithm determines a class of blockage from a plurality of blockage classes. The class of blockage is determined by classification of at least a part of the camera image. At least to some of the blockage classes, a cleaning criterion is assigned, wherein the cleaning criterion described that this particular type of blockage may require a cleaning of the camera sensor, or that a cleaning of the camera sensor is possible with this type of blockage, respectively. Advantageously, both the segmentation and the classification can work independently resulting in a combined prediction to improve the reliability of the system by fusion of the prediction from two models.

The plurality of blockage classes includes at least a soiling class, a droplet class, and a condensation class, to which each a cleaning criterion is assigned. It is possible that additional blockage classes, which refer to other precipitations like ice or snow, and/or to specific types of soiling, for instance soiling by dust, by mud, by sand, by insects etc., are used. The plurality of blockage classes may in particular also include at least one unblocked class to which no cleaning criterion is assigned. The unblocked class represents the state, in which the camera sensor 3, or its transparent camera sensor component 6, is not covered by a blockage. The information about the different blockage classes and cleaning criteria assigned to blockage classes may be stored for instance in the control unit 4.

In step $S_3$, a cleaning information is determined in dependency of the degree of camera sensor blockage and the class of the camera sensor blockage that were determined by the neural network algorithm. The cleaning information describes that a cleaning of the camera sensor 3 is required if a cleaning criterion is assigned to the determined class of the camera sensor blockage and if at least one degree threshold is exceeded by the determined degree of camera sensor blockage.

The cleaning information may be determined by a further algorithm implemented in the control unit 4. The further algorithm may be for instance a decision tree, which is used to determine a cleaning strategy from a plurality of cleaning strategies in dependency of the determined blockage class and/or by comparison of the determined degree of camera sensor blockage to two or more different degree thresholds assigned to each cleaning strategy. The determined cleaning information describes a cleaning strategy for cleaning the camera sensor 3. The cleaning strategy may include for instance cleaning commands for a liquid-based cleaning, an air-based cleaning and/or an actuator-based cleaning, depending on the type of the cleaning device 5.

In step $S_4$, the cleaning information is transmitted to the cleaning device 5 in order to clean the camera sensor 3 according to the determined cleaning strategy. If the cleaning information describes that no cleaning of the camera sensor 3 is necessary, the transmission to the cleaning device 5 may be omitted. In this case, the method can be continued by controlling the camera sensor 3 for capturing the next image (step $S_1$) or by processing the next camera image (step $S_2$) of a plurality of camera images provided by the camera sensor 3.

Figure 3:
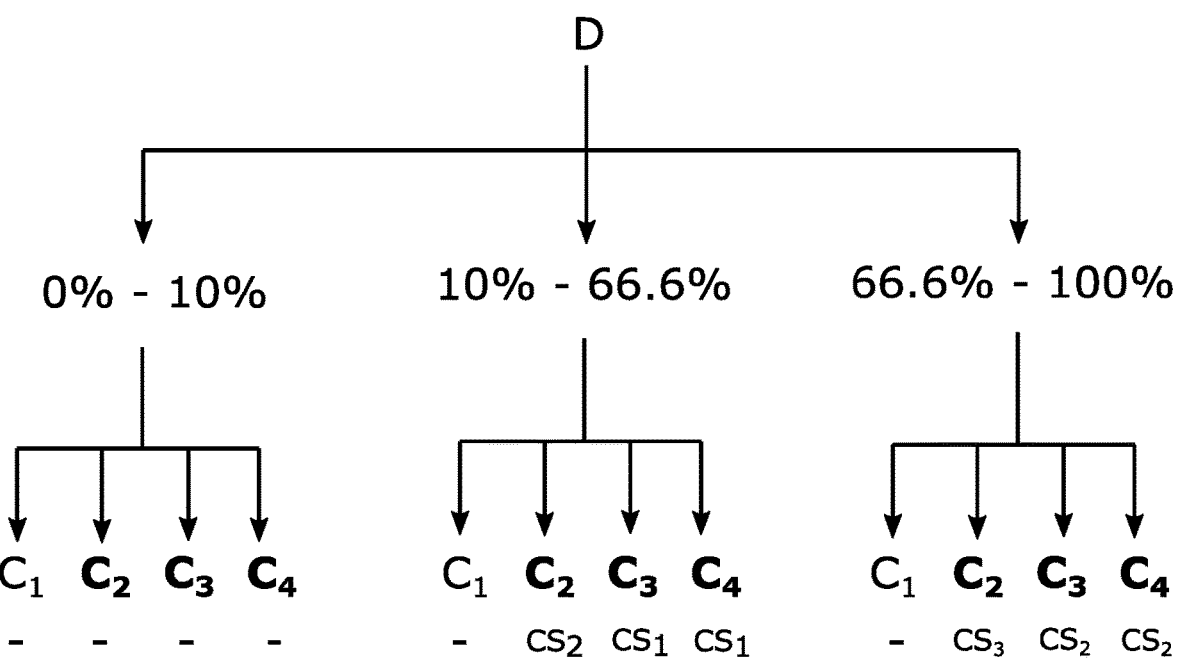
FIG. 3 is an embodiment of a decision tree used as further algorithm for determining the cleaning information.

In FIG. 3, an embodiment of a decision tree used as further algorithm for determining the cleaning information is shown. For the degree of blockage, which is denoted as D, three thresholds are used: 10% and below, 66.6% and below and 100% and below. For each degree of blockage D falling into the corresponding intervals, four different blockage classes $C_1$ to $C_4$, which are differentiated by the neural network algorithm, are shown exemplarily.

To the blockage class $C_1$, which represents for instance an unblocked class, no cleaning criterion is assigned. A cleaning criterion is assigned to the blockage class $C_2$, which is for instance a soiling blockage class, to blockage class $C_3$, which is for instance a condensation blockage class, and to blockage class $C_4$, which is for instance a drops blockage class. The blockage classes, to which a cleaning criterion is assigned, are marked in FIG. 3 by bold letters for differentiation.

Since no cleaning criterion is assigned to blockage class $C_1$, also no cleaning strategy is assigned to blockage class $C_1$ independently of the thresholds for the degree of blockage D. In other words, if the unblocked class is determined as blockage class by classification, no cleaning strategy is conducted independently of the outcome of the determination of the degree of blockage D by the classification. In such a case, the cleaning information may describe for instance that no cleaning is required, or no cleaning information may be determined.

If the degree of blockage D is between 0% and 10%, also the classification of the blockage as one of the blockage classes $C_2$, $C_3$ or $C_4$ will not cause a cleaning of the camera sensor 3, although a cleaning criterion is assigned to each of these blockage classes. This reduces the usage of energy and/or cleaning detergents in the cleaning device 5 in cases, in which the functionality of the camera sensor 3 is not affected by the blockage.

If the degree of blockage is between 10% and 66.6%, a first cleaning strategy $CS_1$ is assigned to each of the blockage classes $C_3$ and $C_4$. To blockage class $C_2$, a second cleaning strategy $CS_2$ is assigned. If the degree of blockage D is between 66.6% and 100%, instead a third cleaning strategy $CS_3$ is associated with blockage class $C_2$, wherein the second cleaning strategy $CS_2$ is associated with the blockage classes $C_3$ and $C_4$.

The decision tree shown in FIG. 3 is merely an example, it is possible that another number of blockage classes, another number of cleaning strategies, another number of degree thresholds and/or different degree thresholds are used.

It is possible that the cleaning strategy is determined additionally in dependence of at least one cleaning device state information, which describes a current state of the cleaning device. The cleaning device state information can be transmitted for instance from the cleaning device 5 to the control unit 4. The cleaning device state information may be for instance a fluid level of a cleaning fluid in a fluid container of the cleaning device 5. In addition or as an alternative, other types of cleaning device state information may be used. Considering also the current state of the cleaning device allows for adapting the cleaning strategy for cleaning the camera sensor 3 to the cleaning capability of the cleaning device 5 in its current state, so that unnecessary or unrealizable commands to the cleaning device 5 can be avoided.

For example, it is possible that a certain cleaning strategy is determined as the cleaning information, or as a part of the cleaning information, respectively, when a fluid level in of the cleaning fluid in the fluid container of the cleaning device 5 is 10% or above, whereas for fluid levels below 10%, another cleaning strategy is chosen. In addition or alternatively, in case of a low fluid level, also a warning and/or a refill request may be issued, for instance as an optical and/or acoustic signal to a driver of the vehicle 1.

Figure 4:
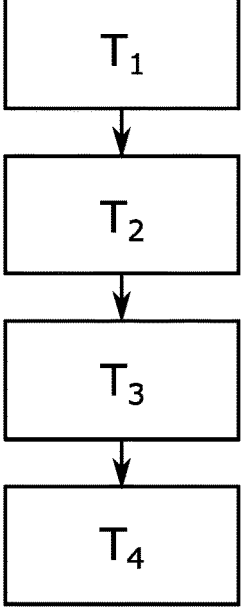
FIG. 4 is a block diagram of an embodiment of the method for training of a neural network algorithm according to the present disclosure.

In FIG. 4, a block diagram of an embodiment of a method for training of a neural network algorithm, in particular for the neural network algorithm in the control unit 4, is shown. The method enables an efficient training of a neural network algorithm for determining both a degree of blockage of a camera sensor and a blockage class of a blockage obstructing at least a portion of the camera sensor's field of view.

In step $T_1$, a plurality of camera images captured by at least one unblocked camera sensor are provided. These images may show in particular different surroundings of the camera sensor that are expected to occur in the regular usage of the camera sensor. For instance, a training of the neural network algorithm in the control unit 4 may be conducted using camera images depicting different scenes from a vehicle surroundings, in particular different traffic situations and/or environments. The camera images may be recorded for instance by the camera sensor 3, or by a comparable camera sensor 3 of the vehicle 1 and/or of another vehicle, respectively.

In step $T_2$, at least some of the camera images are augmented by superimposing a blockage mask on each of these camera images, wherein the blockage mask is assigned to a blockage class of a plurality of blockage classes, wherein the blocking mask blocks a portion of the camera image according to a blocking degree of the blockage mask, wherein the blocking degree is determined stochastically for each camera image. In addition, a label is associated to each camera image, wherein the label describes the blockage class and the blocking degree of the blockage mask augmented to the camera image. The process of augmenting and labelling the camera images is described in more detail in the following referring to FIG. 5.

In step $T_3$, an output of the neural network algorithm is generated for each augmented camera image by processing the augmented camera image through one or more network layers of the neural network algorithm in accordance with parameters associated with the one or more network layers.

In step T4, the generated output for each augmented camera image is compared with the label associated with the augmented camera image using an objective function, and the parameters of the neural network algorithm associated with the layers of the neural network algorithm are updated based on the comparison.

Figure 5:
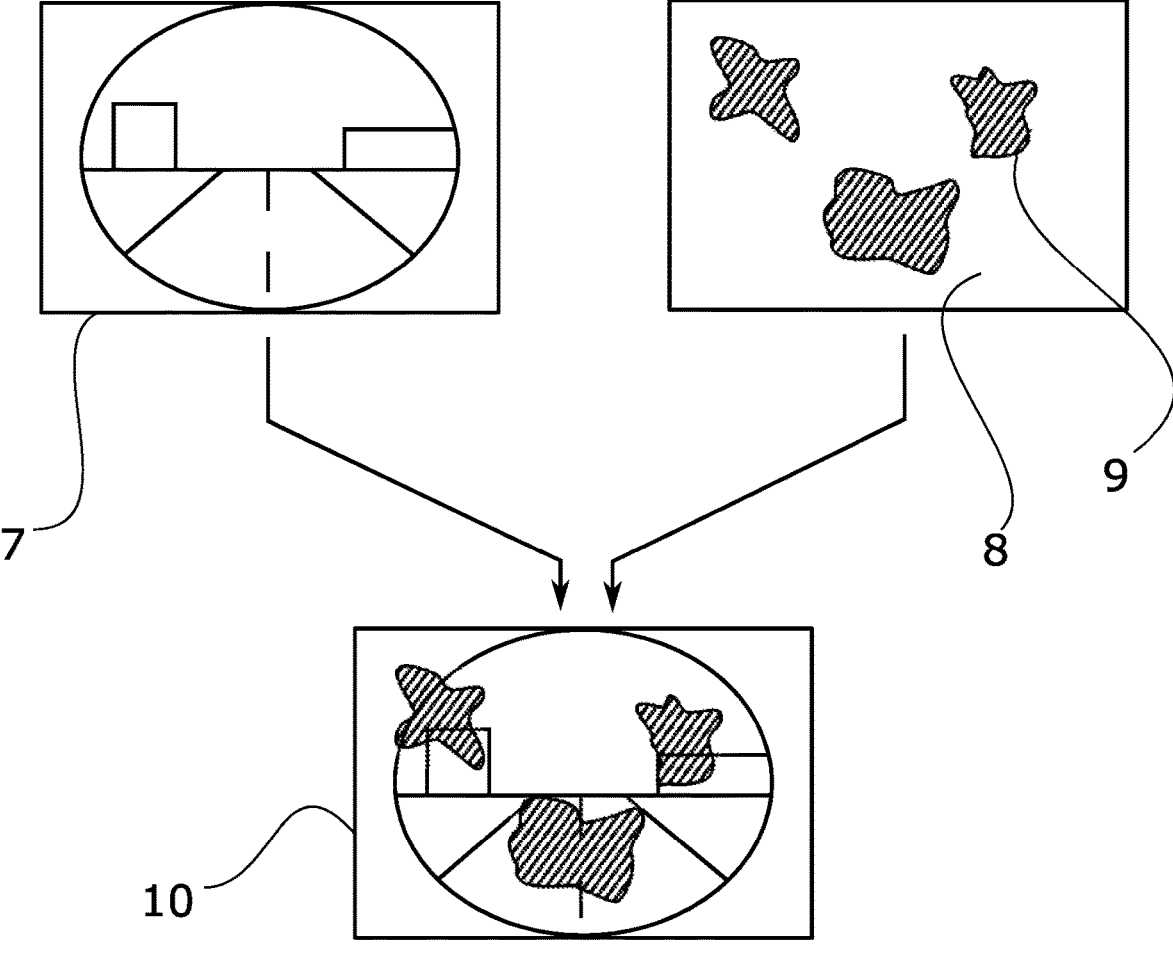
FIG. 5 is a schematic depiction of the augmentation and labelling of camera images in the embodiment of the method for training of a neural network algorithm.

In FIG. 5, the process of augmenting and labelling the camera images for training of the neural network algorithm is explained in detail. The process can be conducted in particular as an automated pipeline by a computer. The camera images to be augmented are provided for instance using the camera sensor 3 in an unblocked state. An unblocked camera image 7 is schematically depicted in FIG. 5.

For augmenting the unblocked camera image 7, i.e. for adding a virtual blockage to the camera image 7 so that it appears as if the camera sensor used for capturing the camera image 7 would have been blocked by a blockage, a blockage mask 8 is used. For each camera image 7 to be augmented, an associated blockage mask 8 is created. The blockage mask creates a virtual blockage of a certain blockage class.

For F each blockage mask 8, the blockage class can be chosen deterministically or stochastically out of a plurality of predefined blockage classes. In addition, each blockage mask provides a virtual blockage overlay for the camera image 7 that covers a portion of the camera image 7 according to a stochastically determined blocking degree. The blocking degree provided by the blockage mask may depend for instance on a number of masking segments 9 and their respective sizes compared to the size of the blockage mask 8, or the camera image 7 to be augmented, respectively. The blocking degree determines the degree of blockage of the camera image 7 after augmenting by the blockage mask 8.

Additionally, one or more further parameters related to the appearance of the blockage mask 8 can be stochastically varied. As further parameter, for instance a color of the individual masking segments 9, a color distribution of the individual masking segments 9, a transparency of the individual masking segments 9, a transparency distribution of the individual masking segments 9, a number of masking segments 9, a distribution of the masking segments 9 in the blockage mask 8, a size of the individual masking segments 9 and/or a contour of the individual masking segments 9 may be used.

In particular, the one or more further parameters may be varied within one or more intervals associated with the blockage class assigned to the blockage mask 8. For instance, if the blockage class of the blockage mask describes a blockage by soiling, the color may be varied between different brownish colors and a transparency is varied between no transparency and 30% transparency. If the blockage class of the blockage mask 8 is for instance drops of rain, much higher transparency values and different colors can be used. In addition, also the number and shape of the blockage segments 9 could be varied differently to reproduce the appearance of rain drops on the transparent camera component 6.

The blockage mask 8 is then used to augment the camera image 7. Therefore, the blockage mask 8 is superimposed on the camera image 7 creating an augmented camera image 10. In addition, a label is associated with the augmented camera image 10, wherein the label describes the blockage class and the blocking degree of the blockage mask superimposed on the camera image 7. It is possible, that the label includes a value for the degree of blockage created by the blockage mask or that for instance a binary image label corresponding to the blockage mask is provided, which marks both the areas blocked by the segments 9 and the unblocked areas. The label is created in particular automatically in course of the augmentation of the camera image 7. This has the advantage that no subsequent manual labelling is required.

The augmented camera images 10 are then used for training, in particular for training the neural network algorithm of the control unit 4. In addition to the augmented camera images 10, also unblocked camera images may be used. These unblocked camera images may be associated with an unblocked blockage class and hence include correspondingly a label describing the unblocked blockage class.

The automated generation of the augmented camera images 10 has the advantage that a large number of training images may be created that cover a wide variety of different blockage conditions. This allows for efficiently training a neural network algorithm on determining a degree of blockage and a blockage class for camera images 7 provided from a blocked camera sensor 3, in particular during the operation of the vehicle 1.

The neural network algorithm trained on augmented camera images 10 may then be used to evaluate and predict on real blockages of camera images. Therefore, the weights, i.e. the updated parameters of the neural network algorithm, learned during the training with the augmented data set are used in a neural network algorithm to do a prediction on real world data set part in terms of blockage. Advantageously, a trained neural network algorithm may be provided in this way without the need to provide real blocked images, which may be difficult to acquire for real vehicle driving scenarios. However, it is possible to use the neural network algorithm pretrained on an augmented data set and further fine-tune it on a real data set including real blocked camera images with the same degree of blockage and blockage class selected from the plurality of blockage classes to obtain a further improvement of the performance of the neural network algorithm.

The invention claimed is:

1. A method for determining a cleaning information for an at least partially blocked camera sensor, which comprises a blockage on a transparent camera sensor component in an optical path of the camera sensor, wherein the method uses a neural network algorithm that comprises: controlling the camera sensor to capture at least one camera image, processing, by a computing device, the at least one camera image with a neural network algorithm, wherein the neural network algorithm is configured to determine as an output, from the at least one camera image, a degree of camera sensor blockage by segmentation of at least a part of the at least one camera image and a blockage class of the camera sensor blockage from a plurality of blockage classes by classification of at least a part of the at least one camera image, wherein the degree of camera sensor blockage relates to a comparison of a first area of segments in the at least one camera image depicting the blockage to a second area of unblocked segments in the at least one camera image depicting surroundings;

determining cleaning information in dependency of the degree of camera sensor blockage and the blockage class of the camera sensor blockage, wherein the cleaning information describes that a cleaning of the camera sensor is required, if a cleaning criterion is assigned to the blockage class of the camera sensor blockage and if at least one degree threshold is exceeded by the determined degree of camera sensor blockage, and transmitting the cleaning information to a cleaning device associated with the camera sensor in order to clean the camera sensor according to the cleaning information, wherein the neural network algorithm is trained by a training method comprising the following steps:

providing a plurality of training camera images captured by at least one unblocked camera sensor, augmenting at least some of the training camera images by superimposing a blockage mask on each training camera image, wherein the blockage mask is assigned to a blockage class of the plurality of blockage classes, wherein the blockage mask blocks a portion of the training camera image according to a blocking degree of the blockage mask, wherein the blocking degree is determined stochastically for each training camera image, associating a label to each training camera image, wherein the label describes the blockage class and the blocking degree of the blockage mask augmented to the training camera image, generating an output of the neural network algorithm for each augmented training camera image by processing the augmented camera image through one or more network layers of the neural network algorithm in accordance with parameters associated with the one or more network layers, comparing the generated output for each augmented camera image with the label associated with the augmented camera image using an objective function, and updating the parameters associated with the one or more network layers based on the comparison.

2. The method according to claim 1, wherein the neural network algorithm comprises at least one of a semantic segmentation algorithm or an algorithm comprising both a binary segmentation and a classifier model.

3. The method according to claim 1, wherein the plurality of blockage classes comprises at least one unblocked class to which no cleaning criterion is assigned.

4. The method according to claim 1, wherein the plurality of blockage classes comprises at least one of a soiling class, a droplet class, or a condensation class, to which each cleaning criterion is assigned.

5. The method according to claim 1, wherein the cleaning information is determined by a further algorithm, wherein the cleaning information describes a cleaning strategy for cleaning the camera sensor, wherein the cleaning strategy is determined from a plurality of cleaning strategies in dependency of at least one of the determined blockage class or by comparison of the determined degree of camera sensor blockage to two or more different degree thresholds assigned to each cleaning strategy.

6. The method according to claim 5, wherein the cleaning strategy is determined additionally in dependence of at least one cleaning device state information which describes a current state of the cleaning device.

7. The method according to claim 1, wherein the cleaning information comprises cleaning commands for at least one of a liquid-based cleaning, an air-based cleaning or an actuator-based cleaning.

8. A method for training of a neural network algorithm, wherein the neural network algorithm is configured to be used in a method for determining a cleaning information for an at least partially blocked camera sensor, which comprises a blockage on a transparent camera sensor component in an optical path of the camera sensor, the method for training comprising:

providing a plurality of training camera images captured by at least one unblocked camera sensor, augmenting at least some of the training camera images by superimposing a blockage mask on each training camera image, wherein the blockage mask is assigned to a blockage class of the plurality of blockage classes, wherein the blockage mask blocks a portion of the training camera image according to a blocking degree of the blockage mask, wherein the blocking degree is determined stochastically for each training camera image, associating a label to each training camera image, wherein the label describes the blockage class and the blocking degree of the blockage mask augmented to the training camera image, generating an output of the neural network algorithm for each augmented training camera image by processing the augmented camera image through one or more network layers of the neural network algorithm in accordance with parameters associated with the one or more network layers, comparing the generated output for each augmented camera image with the label associated with the augmented camera image using an objective function, and updating the parameters associated with the one or more network layers based on the comparison.

9. The method according to claim 8, further comprising stochastically varying at least one further parameter related to an appearance of the blockage mask, wherein the at least one further parameter comprises at least one of a color, a color distribution, a transparency, a transparency distribution, a number of masking segments, a distribution of masking segments, a size of masking segments or a contour of masking segments of the blockage mask.

10. The method according to claim 9, wherein the at least one further parameter is varied within one or more intervals associated with the blockage class assigned to the blockage mask.

11. A control unit comprising a computer, wherein a control unit comprising a computer is configured to carry out a method according to claim 1.

12. A camera sensor system comprising the at least one camera sensor, the cleaning device associated with the camera sensor and a control unit according to claim 11.

13. A vehicle comprising the camera sensor system according to claim 12.

14. A computer program stored on a non-transitory storage medium, the computer program comprising instructions which, when executed by a computer, control the computer to carry out the method according to claim 1.

* * * * *